United States Patent
Ko et al.

(10) Patent No.: US 12,167,352 B2
(45) Date of Patent: Dec. 10, 2024

(54) METHOD AND DEVICE FOR TRANSMITTING S-SSB IN NR V2X

(71) Applicant: LG ELECTRONICS INC., Seoul (KR)

(72) Inventors: Woosuk Ko, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 292 days.

(21) Appl. No.: 17/763,456

(22) PCT Filed: Sep. 29, 2020

(86) PCT No.: PCT/KR2020/013308
§ 371 (c)(1),
(2) Date: Mar. 24, 2022

(87) PCT Pub. No.: WO2021/066507
PCT Pub. Date: Apr. 8, 2021

(65) Prior Publication Data
US 2022/0346041 A1      Oct. 27, 2022

(30) Foreign Application Priority Data
Oct. 2, 2019  (KR) .................. 10-2019-0122611

(51) Int. Cl.
*H04W 56/00*      (2009.01)
*H04L 5/00*       (2006.01)
*H04W 72/1263*    (2023.01)

(52) U.S. Cl.
CPC ......... *H04W 56/001* (2013.01); *H04L 5/0051* (2013.01); *H04W 72/1263* (2013.01)

(58) Field of Classification Search
CPC ........... H04W 56/001; H04W 72/1263; H04W 76/14; H04W 48/10; H04W 4/40;
(Continued)

(56) References Cited

U.S. PATENT DOCUMENTS

2017/0272299 A1*  9/2017  Chae ................ H04L 5/0048
2018/0287866 A1   10/2018 Nam
(Continued)

FOREIGN PATENT DOCUMENTS

CN          109155728        1/2019

OTHER PUBLICATIONS

LG Electronics, Discussion on NR sidelink synchronization mechanism R1-1908904, 3GPP TSG RAN WG1 #98 Meeting, Prague, Czech Republic, Aug. 17, 2019, see pp. 1-13.
(Continued)

*Primary Examiner* — Chae S Lee
(74) *Attorney, Agent, or Firm* — BRYAN CAVE LEIGHTON PAISNER LLP

(57) ABSTRACT

An operating method of a first device (100) in a wireless communication system is presented. The method comprises the steps of: determining whether DM-RS are mapped to a first symbol or a second symbol of symbols associated with a PSBCH; determining whether a first payload or a second payload is mapped to the first symbol or the second symbol; generating a sidelink synchronization signal block (S-SSB); and transmitting the S-SSB to a second device (200).

6 Claims, 23 Drawing Sheets

(58) Field of Classification Search
CPC .............. H04W 72/0453; H04W 72/20; H04L 5/0051; H04L 27/261; H04L 27/26025; H04L 27/2607; H04L 5/0048; H04L 5/0083; H04L 5/0094; H04L 5/0044; H04L 27/2613; H04J 11/00; H04J 11/0073; H04J 11/0076

See application file for complete search history.

(56) References Cited

U.S. PATENT DOCUMENTS

| | | | |
|---|---|---|---|
| 2019/0045469 A1 | 2/2019 | Zhang et al. | |
| 2020/0015214 A1* | 1/2020 | Si | H04L 27/26025 |
| 2020/0229114 A1* | 7/2020 | Ryu | H04L 27/26025 |
| 2022/0046562 A1* | 2/2022 | Yuan | H04W 56/001 |
| 2022/0086782 A1* | 3/2022 | Chen | H04L 5/001 |
| 2022/0295425 A1* | 9/2022 | Ren | H04W 56/001 |

OTHER PUBLICATIONS

Nokia et al., Discussion on NR V2X Sidelink Synchronization mechanism, R1-1908285, 3GPP TSG-RAN WG1 Meeting #98, Prague, Czech Republic, Aug. 17, 2019, see sections 2-4.

CATT, "Feature lead summary on AI 7.2.4.3 Sidelink synchronization mechanism", 3GPP TSG RAN WG1 Meeting #98, R1-1909828, Prague, CZ, Aug. 26-30, 2019.

* cited by examiner

FIG. 4
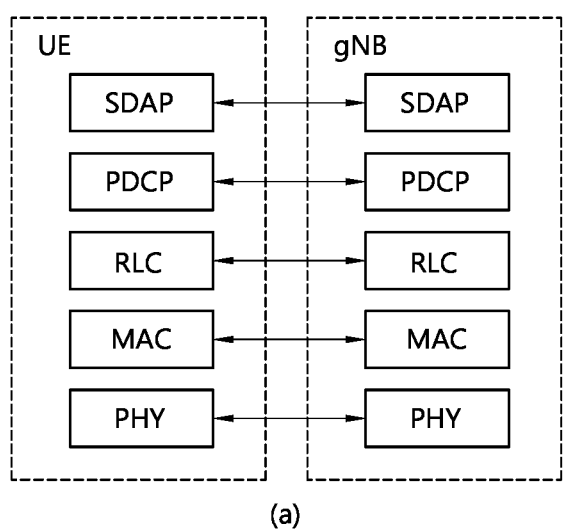
(a)
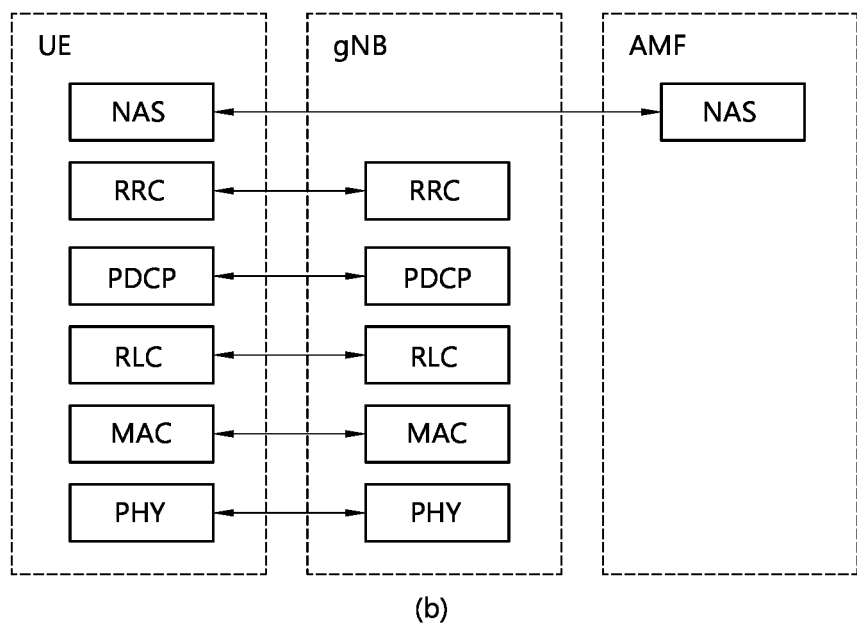
(b)

FIG. 8
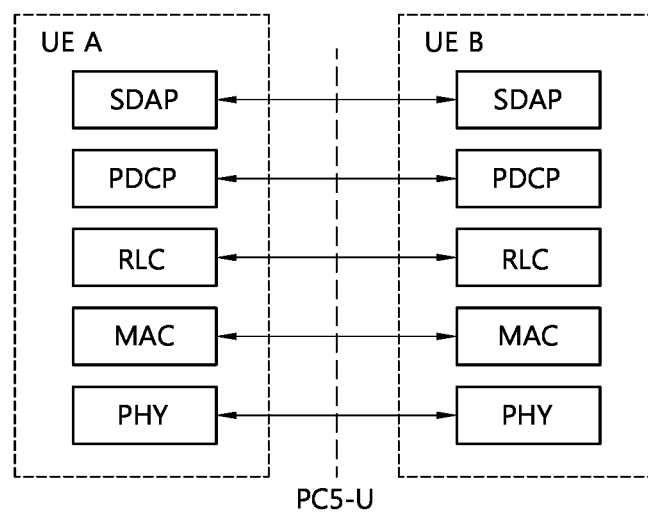
(a)
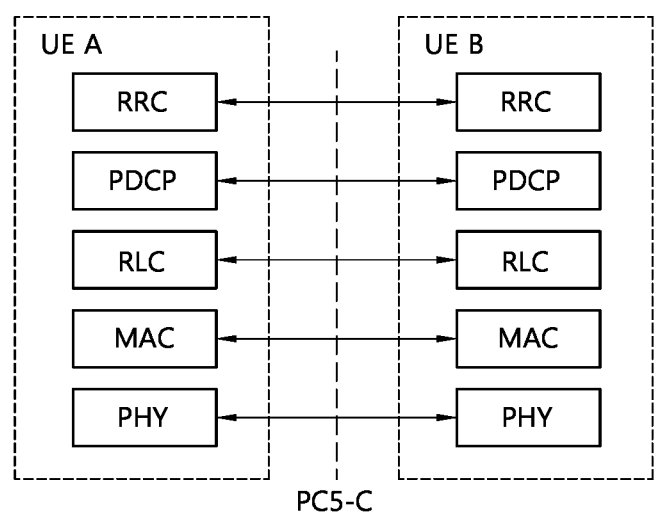
(b)

S1710

METHOD AND DEVICE FOR TRANSMITTING S-SSB IN NR V2X

This application is the National Stage filing under 35 U.S.C. 371 of International Application No. PCT/KR2020/013308 filed on Sep. 29, 2020, which claims priority to Korean Patent Application No. 10-2019-0122611 filed on Oct. 2, 2019, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as BSM (Basic Safety Message), CAM (Cooperative Awareness Message), and DENM (Decentralized Environmental Notification Message) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Solutions

According to an embodiment of the present disclosure, an operation method for a first apparatus 100 in a wireless communication system may be proposed. The method may include: determining whether to map a demodulation reference signal (DM-RS) to a symbol 1 or a symbol 2 among symbols related to physical sidelink broadcast channel (PSBCH); determining whether to map a first payload or a second payload to the symbol 1 or the symbol 2; generating a sidelink synchronization signal block (S-SSB); and transmitting the S-SSB to a second apparatus.

EFFECTS OF THE DISCLOSURE

The user equipment (UE) may efficiently perform SL communication.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

DESCRIPTION OF EXEMPLARY EMBODIMENTS

Figure 1:
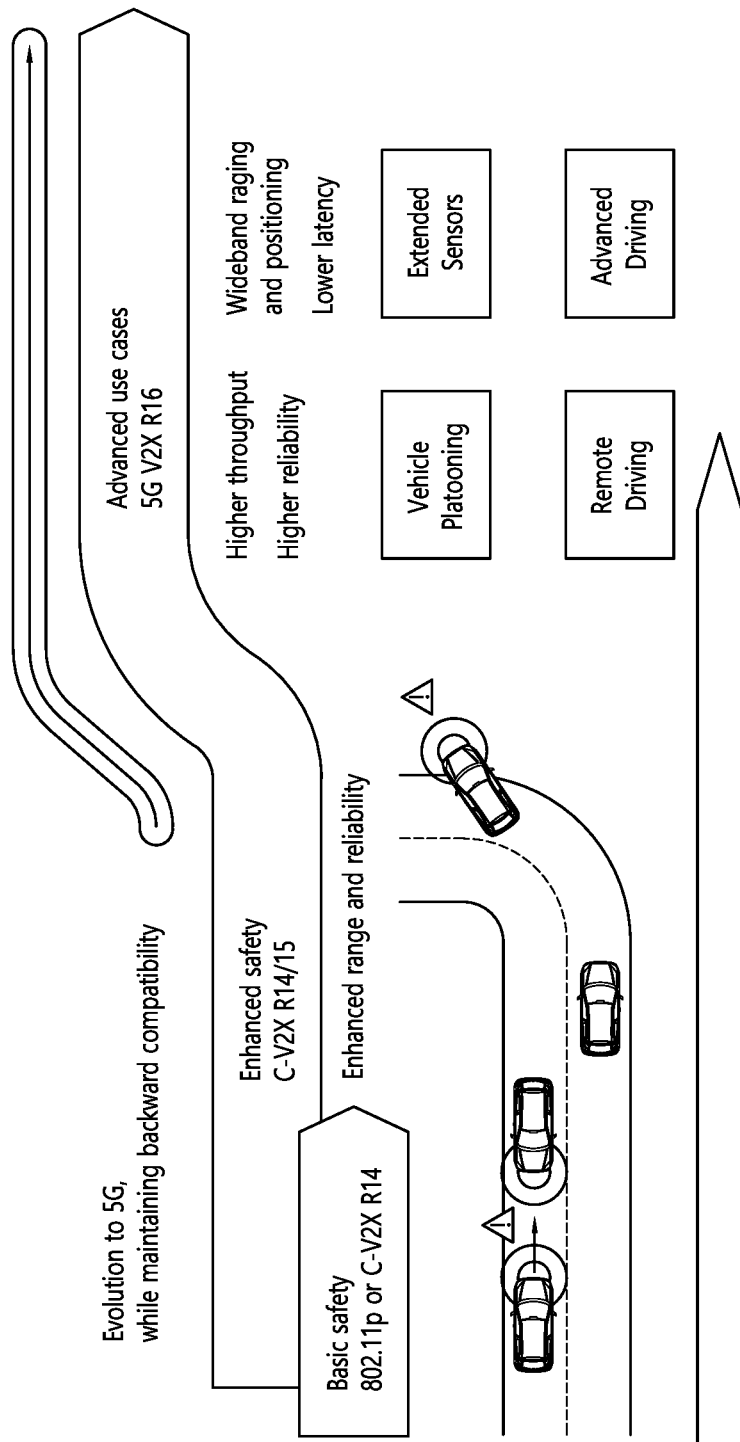
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
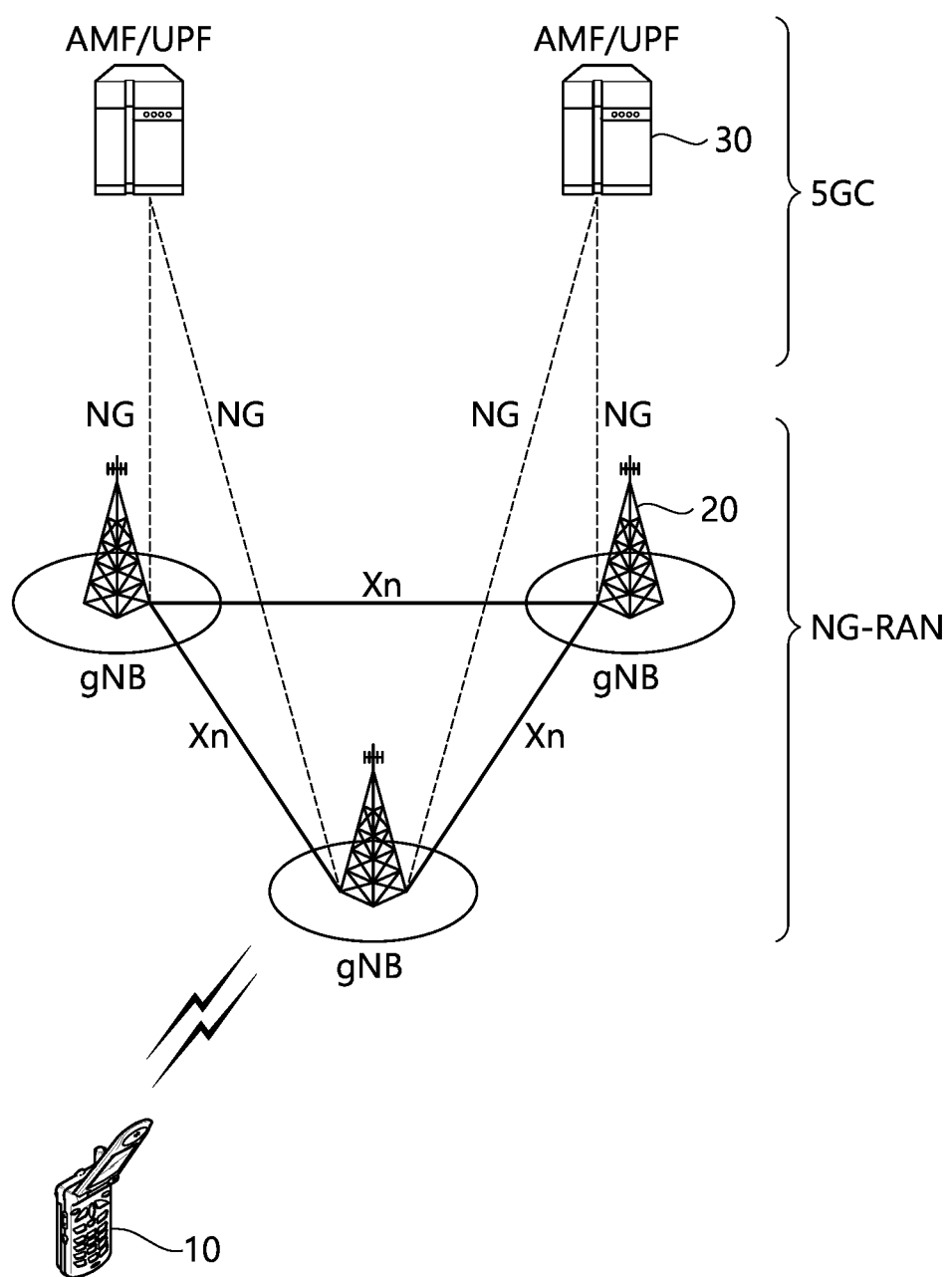
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
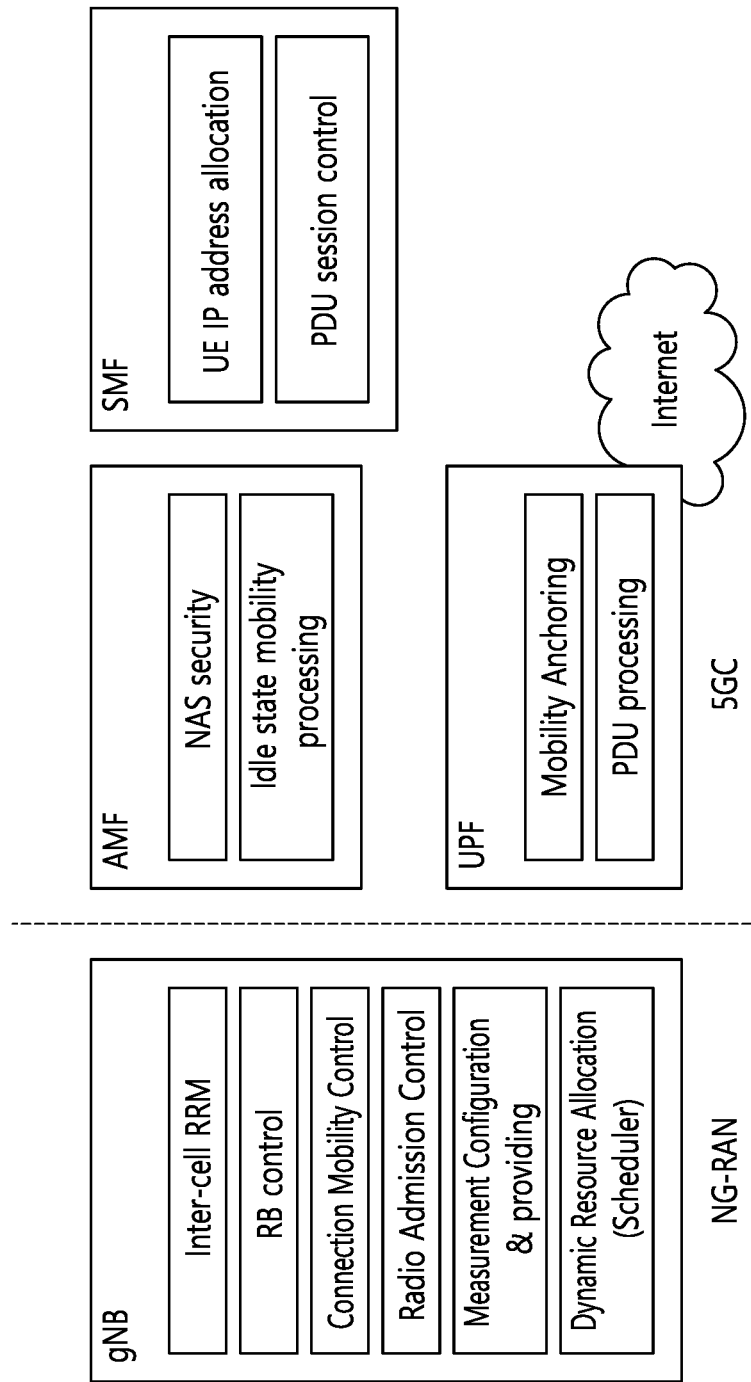
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
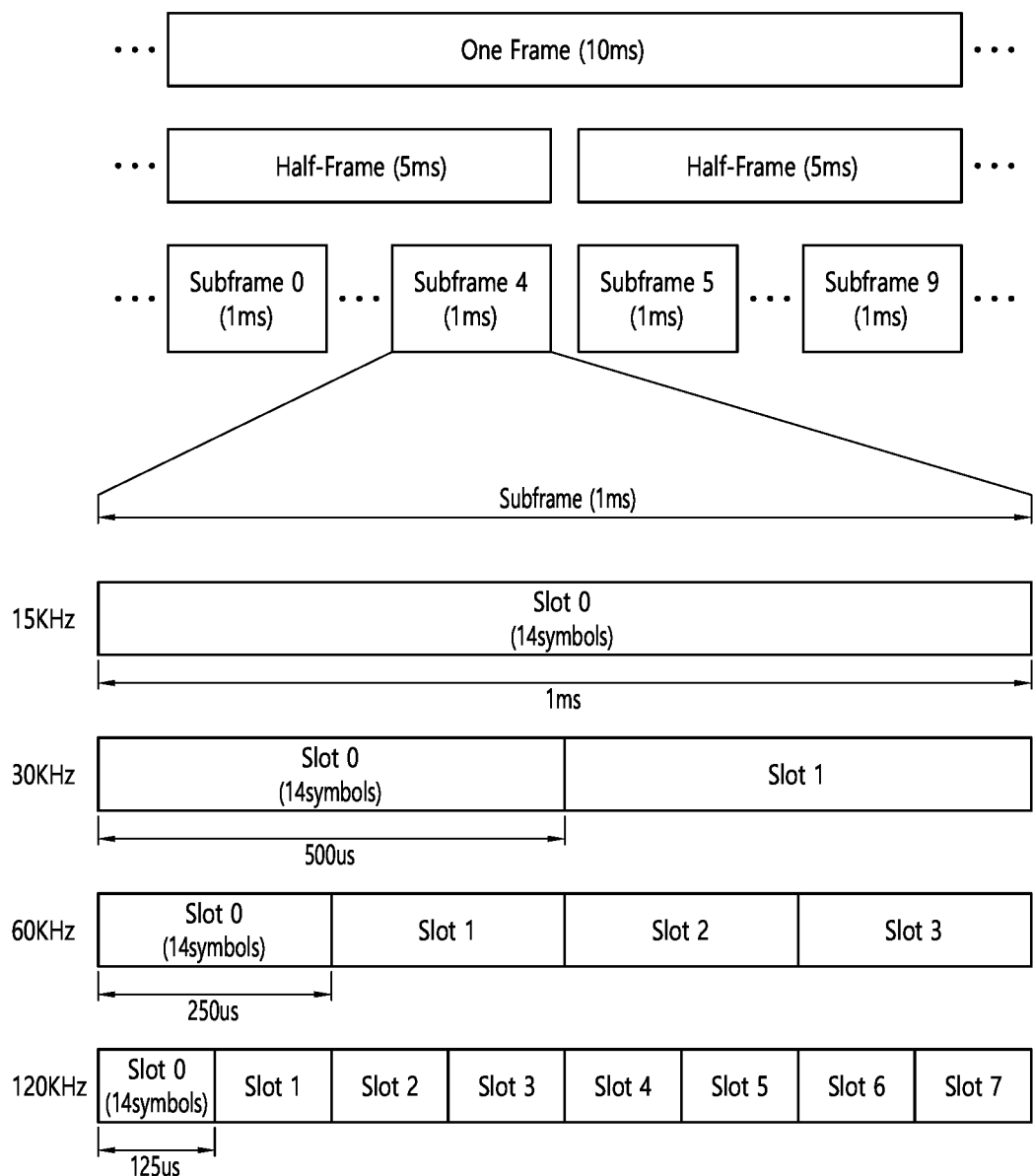
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

FIG. shows a structure of a slot of an NR frame, in accordance with an embodiment of the present disclosure.

Figure 6:
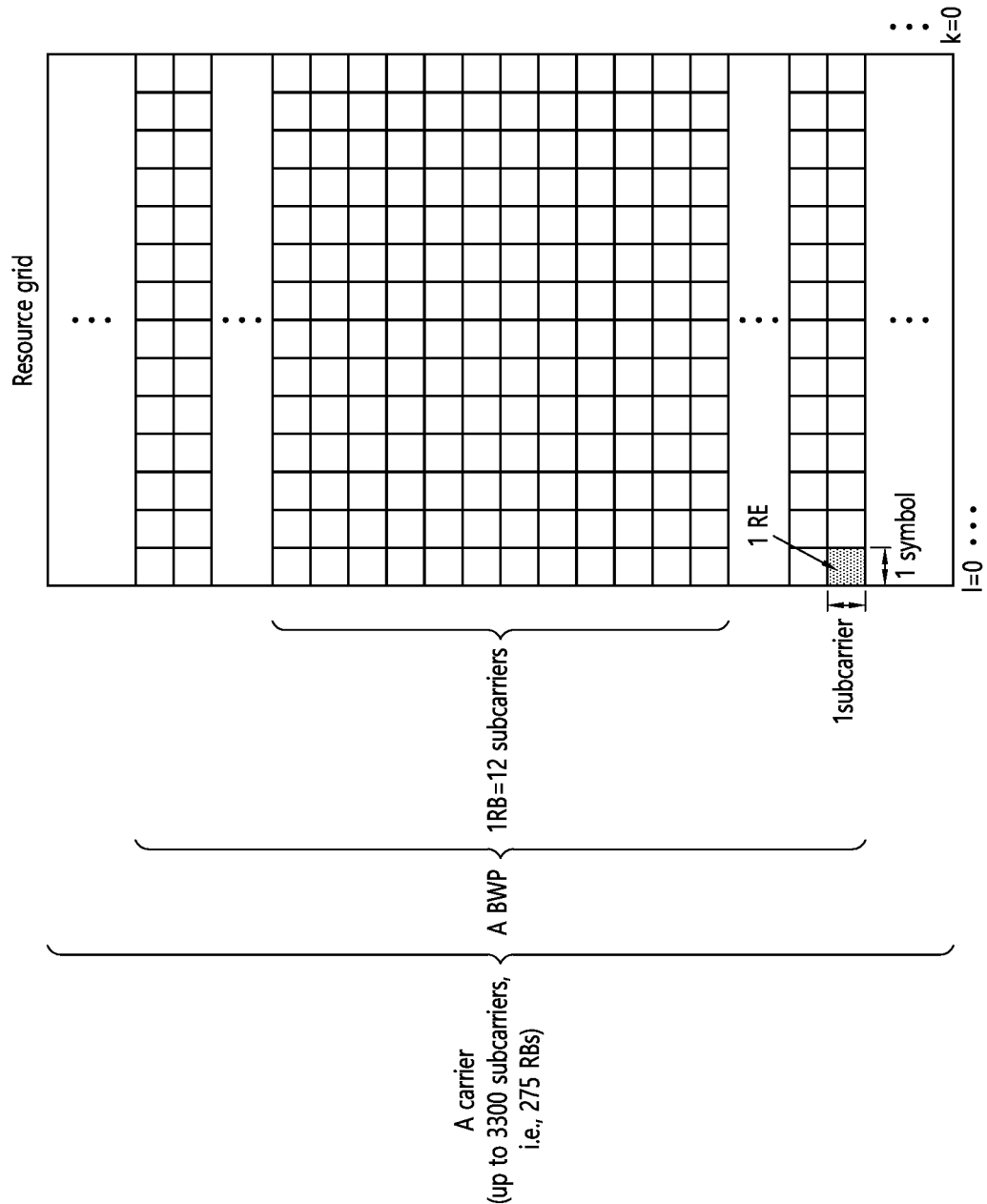
FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
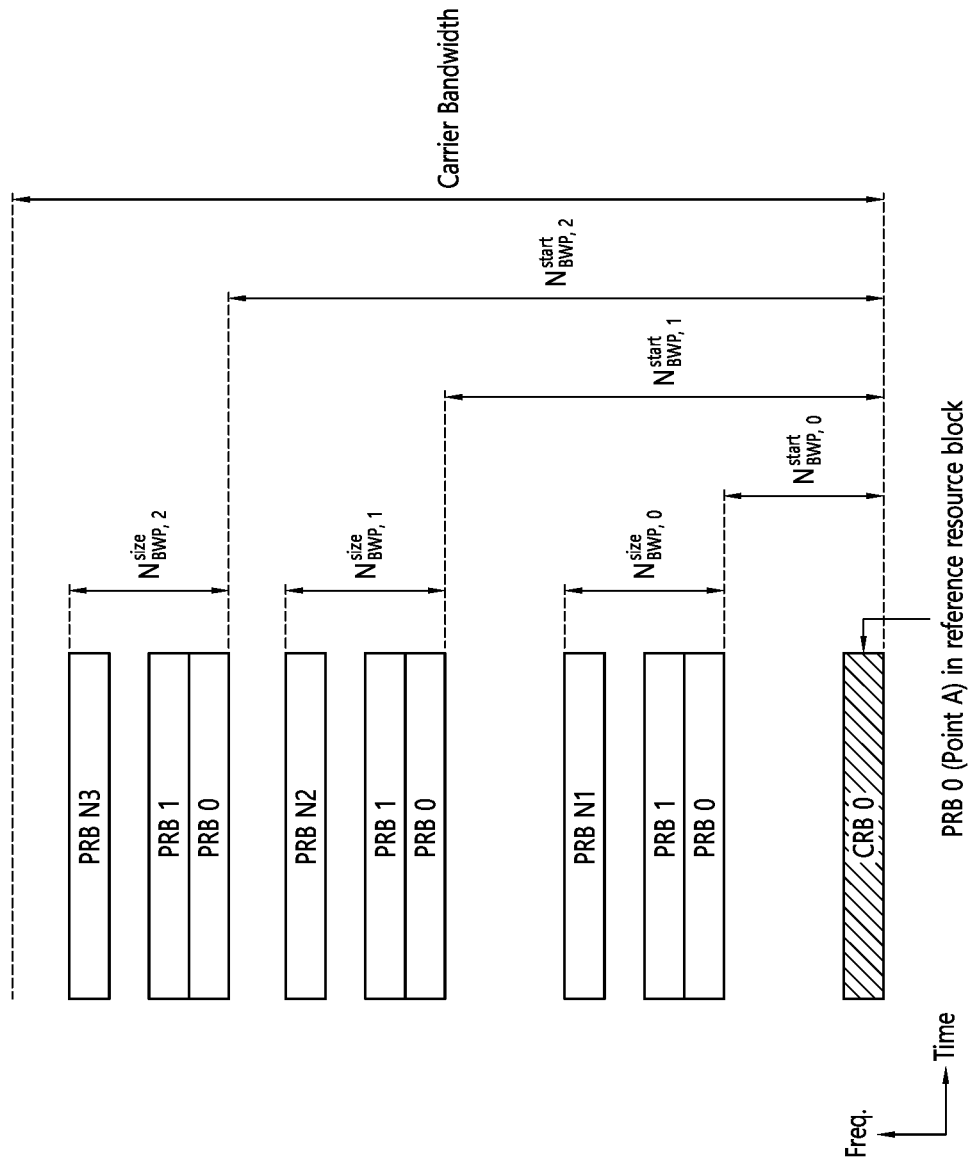
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/ PSBCH block, hereinafter, sidelink-synchronization signal block (S-SSB)) supporting periodical transmission. The S-SSB may have the same numerology (i.e., SCS and CP length) as a physical sidelink control channel (PSCCH)/ physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
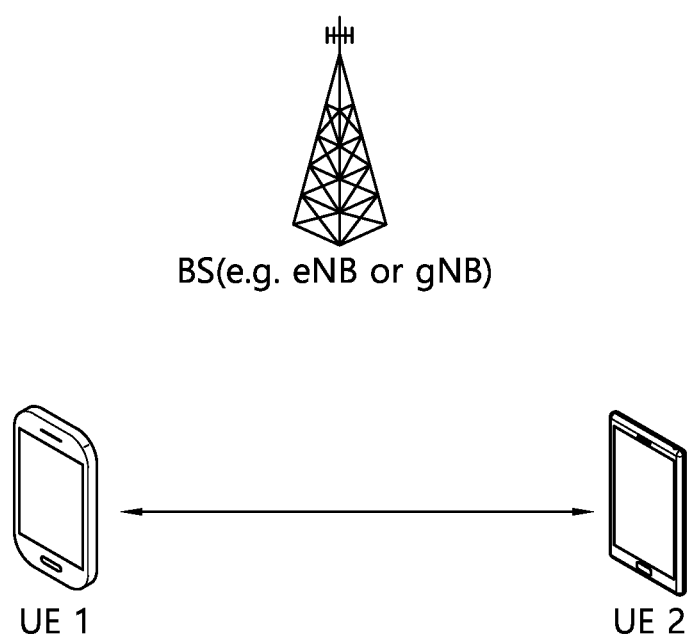
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
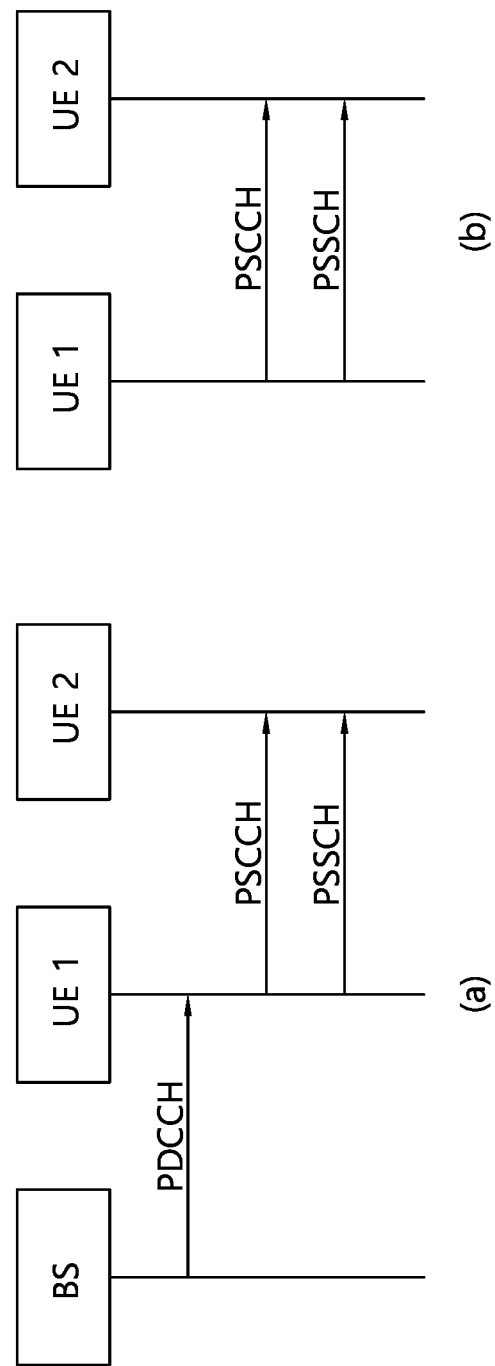
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
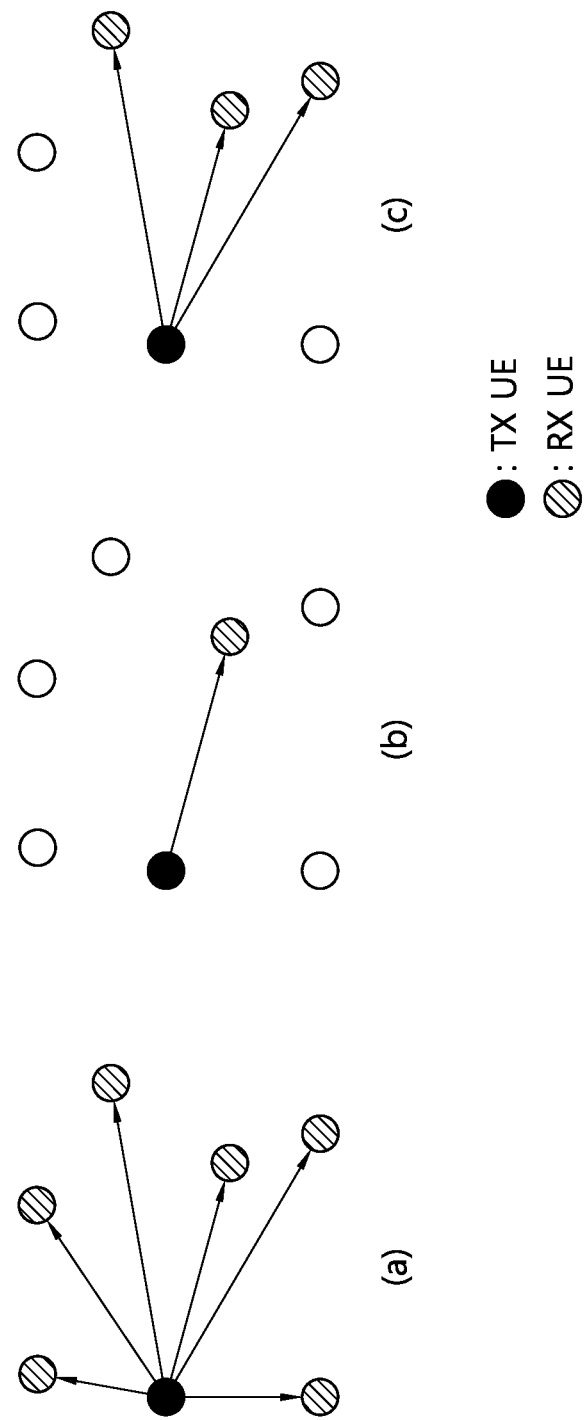
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

In order to synchronize time for SL communication, a user equipment (UE) performing sidelink (SL) communication may use a base station such as gNB/eNB, a global navigation satellite system (GNSS) or a UE synchronized with a gNB/eNB/GNSS as a reference synchronization source as a reference synchronization source, alternatively, it may become a reference synchronization source by itself when there is no reference synchronization source nearby. For example, UEs that use entities such as nearby gNB, eNB, GNSS and/or UE as a reference synchronization source or themselves become a reference synchronization source, may gradually form and expand a synchronization cluster using the same reference synchronization source by transmitting their S-SSB (sidelink synchronization signal block) to the surroundings.

For example, an S-SSB transmitted by a UE for time synchronization for SL communication may be largely composed of a sidelink primary synchronization signal (S-PSS), a sidelink secondary synchronization signal (S-SSS), and a sidelink physical broadcast channel (PSBCH). For example, an S-PSS signal may be used for initial signal detection and synchronization purposes. For example, an S-SSS signal may be used together with an S-PSS signal for the purpose of obtaining detailed synchronization or detecting a synchronization signal ID. For example, a PSBCH may be used for basic system information signaling. Therefore, each signal constituting an S-SSB is a signal that plays a very important role in order to obtain synchronization and basic system information, for normal data communication, a process of receiving and decoding an S-SSB signal may have to be performed in the initial stage of communication.

As described above, due to the importance of receiving an SSB signal, an SSB signal may have to be designed to maximize reception and decoding performance. For example, as one of factors capable of maximizing an SSB signal, a process of optimizing the transmission power according to characteristics of each component signal constituting an SSB may be included. For example, each of the configuration signals may include an S-PSS, an S-SSS, and/or a PSBCH. For example, Maximum Power Reduction (MPR) may be adjusted according to a Peak to Average Power Ratio (PAPR) of each component signal. For example, an actual signal transmission power may be determined based on an MPR. At this time, for example, when a required MPR value is different because a PAPR value for each component signal of an SSB is different, in order to maximize reception performance when transmitting a signal from a V2X UE, an optimal MPR may be applied to each component signal. For example, when an optimal MPR is applied to each component signal as described above, an MPR applied to each component signal may be different from each other. As described above, the average power of each component signal may be different based on different MPRs, for example, it may be necessary to transition an amplification operation according to a different average power for each component signal. A transmitter amplifier of a UE may apply a transient period to perform a necessary amplification transition. A transition period preserves the time required for an amplifier to perform normal operation at the boundary where the power of a transmission signal changes. Through this section, an amplifier may transition from one amplification operation related to the power of one transmission signal to the other amplification operation related to the power of the other transmission signal.

Figure 12:
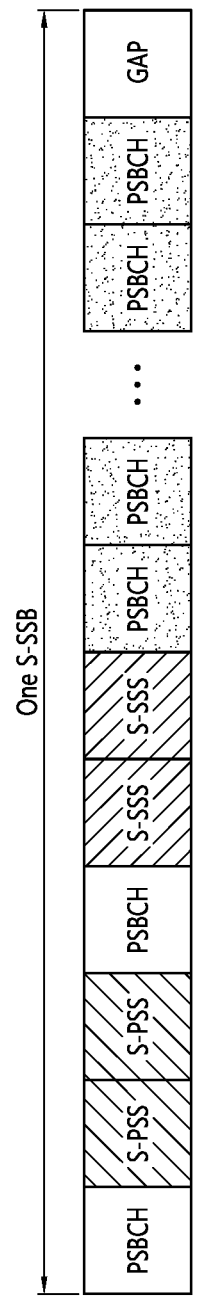
FIG. 12 shows a configuration of a symbol related to an S-SSB according to an embodiment of the present disclosure.

FIG. 12 shows a configuration of a symbol related to an S-SSB according to an embodiment of the present disclosure. The embodiment of FIG. 12 may be combined with various embodiments of the present disclosure. In the present specification, for convenience of description, a symbol related to PSBCH may be referred to as a PSBCH symbol.

Referring to FIG. 12, an S-SSB may include at least one symbol related to an S-PSS, at least one symbol related to an S-SSS, and at least one symbol related to a PSBCH. According to an embodiment of the present disclosure, when different MPRs are applied to an S-PSS and an S-SSS based on PAPR values of the different S-PSS and S-SSS, as sidelink synchronization signal (SLSS) detection performance is maximized, overhead due to a transition period may be minimized. A PSBCH symbol, the first symbol among symbols related to an S-SSB of FIG. 12 (hereinafter, a first PSBCH symbol) may be used to transmit a PSBCH payload, at the same time, it may also serve as an AGC reference symbol for an automatic gain control (AGC) operation of a receiving UE. In addition, a PSBCH symbol inserted between a symbol related to an S-PSS and a symbol related to an S-SSS (hereinafter, a second PSBCH symbol) is also a necessary transition interval because of the application of different MPR between an S-PSS and an S-SSS as described above. For example, if a MPR of a PSBCH is similar to that of an S-SSS, when a MPR of an S-PSS and the MPR of the PSBCH are different from each other, a first PSBCH symbol may also act as a transition period because MPRs of the S-PSS and the PSBCH are also different.

For example, a transition period is not limited to be applied only to the time domain related to a first PSBCH symbol and a second PSBCH symbol, for example, it may be dividedly applied to a part of a first PSBCH symbol period and apart of a first S-PSS symbol period, or it may be dividedly applied to a part of a second S-PSS symbol period and a part of a second PSBCH symbol period.

For example, the above-described transition period may require a constant time period regardless of subcarrier spacing (SCS). For example, when SCS is larger than when SCS is small, the time length of one symbol is shortened, therefore, in both cases, when SCS is large, the proportion of the same length of a transition period in one symbol may be increased. As described above, if the proportion of a transition period in one symbol is increased, the detection performance and decoding performance related to a first PSBCH symbol and a second PSBCH symbol in an S-SSB may be deteriorated. That is, for example, a first PSBCH symbol may be used as an AGC symbol and a transition period, and a second PSBCH symbol may be used as a transition period. However, from the viewpoint of a PSBCH symbol, distortion of two PSBCH symbols by a transition period may be a factor to deteriorate the reception performance of a PSBCH.

In the present disclosure, like above, a configuration method related to a PSBCH symbol that can prevent reception performance degradation due to symbols related to a PSBCH serving as a transition period and efficiently performing the roles of symbols related to AGC and transition period is proposed.

According to an embodiment of the present disclosure, as described above, for a case in which SCS is greater (e.g., 30 kHz or 60 kHz) than when SCS is small (e.g., 15 kHz), configuration for a first and a second PSBCH symbols may be configured as follows. For example, decoding for a PSBCH symbol may be performed through estimation of a transmission channel experienced by a PSBCH symbol, equalization of a PSBCH symbol performed using the estimated channel information, and forward error correction (FEC) decoding process for a payload transmitted by a PSBCH symbol. Therefore, for example, when the proportion of a transition period in a first and second PSBCH symbols is large due to relatively large SCS (e.g., 30 kHz or 60 kHz), a demodulation reference signal (DMRS) may not be inserted in a first and a second PSBCH symbols. Conversely, for example, when the proportion of a transition period in a first and a second PSBCH symbols is small due to relatively small SCS (e.g., 15 kHz), a DMRS may be inserted in the first and second PSBCH symbols. By determining whether to insert a DMRS as described above, when the proportion of a transition period is high, a distorted DMRS in a first and a second PSBCH symbols is used for estimating a transport channel, thereby increasing the estimation error of the transport channel, equalization is performed based on the transmission channel having a high estimation error, and finally, a case in which an FEC decoding error for a PSBCH payload increases can be prevented. For example, a UE may always insert a DMRS for all PSBCH-related symbols except for a first and a second PSBCH symbols to be used for channel estimation.

According to an embodiment of the present disclosure, when SL communication is performed in a frequency range 2 (FR2) frequency band in which relatively large SCS is used, a DMRS may not be inserted in a first and a second PSBCH symbols. In addition, when SL communication is performed in an FR1 frequency band in which relatively small SCS is used, a DMRS may be inserted into a first and a second PSBCH symbols. For example, a DMRS may always be inserted into the remaining symbols related to PSBCH in the S-SSB. As such, the advantages obtained by determining whether to insert a DMRS and the reason for determining may be the same as the description of an operation of determining whether to insert a DMRS based on the SCS.

According to an embodiment of the present disclosure, it may be determined whether a DMRS is inserted into a symbol related to a PSBCH based on the length of a cyclic prefix (CP) used for SL communication. For example, if a CP used for SL communication is a Normal CP, the proportion of a transition period in a first and a second PSBCH symbols may be relatively higher than in a case of using an Extended CP. Therefore, when a CP used for SL communication is a normal CP, a transition period may have a greater influence on the decoding performance of a PSBCH symbol. For example, when a Normal CP is used for SL communication, a DMRS is not inserted in a first and a second PSBCH symbols, when an Extended CP is used, a DMRS may be inserted into a first and a second PSBCH symbols. For example, a DMRS may always be inserted into the remaining symbols related to PSBCH in the S-SSB.

According to an embodiment of the present disclosure, whether a DMRS is inserted in a first and a second PSBCH symbols in relation to the lengths of the frequency domains (FR1, FR2), SCS, and CP may be determined by each of the three conditions or a combination of the three conditions.

Figure 13:
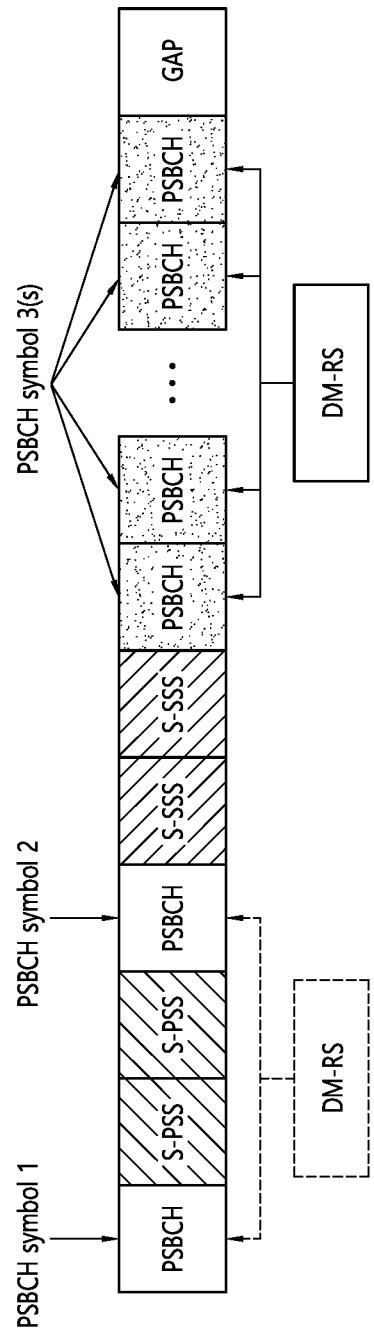
FIG. 13 shows a relationship between a symbol related to an S-SSB and a DM-RS according to an embodiment of the present disclosure.

FIG. 13 shows a relationship between a symbol related to an S-SSB and a DM-RS according to an embodiment of the present disclosure. FIG. 13 may be combined with various embodiments of the present disclosure.

Referring to FIG. 13, an S-SSB may include at least one PSBCH-related symbol, at least one S-PSS-related symbol, and at least one S-SSS-related symbol. For example, a PSBCH may be mapped to a first symbol (hereinafter, referred to as a first PSBCH symbol). The S-SSB may include one PSBCH-related symbol (hereinafter, a second PSBCH symbol) between the at least one S-PSS-related symbol and the at least one S-SSS-related symbol. A PSBCH may be mapped to the second PSBCH symbol. In addition, the S-SSB may include at least one PSBCH-related symbol (hereinafter, referred to as a third PSBCH symbol) after the at least one S-SSS symbol. A PSBCH may be mapped to the third PSBCH symbol. For example, a DM-RS may be inserted into the third PSBCH symbol.

For example, a UE may insert a DM-RS into the first PSBCH symbol and/or the second PSBCH symbol based on SL communication using 15 kHz SCS. Alternatively, a UE may not insert a DM-RS into the first PSBCH symbol and/or the second PSBCH symbol based on SL communication using an SCS of 30 kHz or higher.

For example, a UE may insert a DM-RS into the first PSBCH symbol and/or the second PSBCH symbol based on SL communication performed in FR1. Alternatively, a UE may not insert a DM-RS into the first PSBCH symbol and/or the second PSBCH symbol based on SL communication performed in FR2.

For example, a UE may insert a DM-RS into the first PSBCH symbol and/or the second PSBCH symbol based on SL communication using an Extended CP. Alternatively, a UE may not insert a DM-RS into the first PSBCH symbol and/or the second PSBCH symbol based on SL communication using a Normal CP.

According to an embodiment of the present disclosure, payloads related to a first and a second PSBCH symbols may be determined based on the frequency domain and the length of SCS and/or a CP. For example, the frequency domain may include FR1 and FR2. For example, when the reception performance in a symbol related to a PSBCH is not degraded by a transition period, independent PSBCH payloads are transmitted through a first and a second PSBCH symbols, when the reception performance in PSBCH symbol is degraded by a transition period, the same payload as a PSBCH payload, instead of independent PSBCH payloads, transmitted through the remaining PSBCH symbols in the S-SSB may be repeatedly transmitted redundantly through a first and a second PSBCH symbols. Configuration of a PSBCH payload of a first and a second PSBCH symbols related to the frequency domain, SCS, and the length of a CP is as follows.

According to an embodiment of the present disclosure, when the proportion of a transition period in a PSBCH symbol is large due to a relatively large SCS (e.g., 30 kHz or 60 kHz), the same payload as a PSBCH payload transmitted through other PSBCH symbols in an S-SSB may be repeatedly transmitted instead of an independent PSBCH payload through a first and a second PSBCH symbols. In addition, when the proportion of a transition period in a PSBCH symbol is small due to a relatively small SCS (e.g., 15 kHz), an independent PSBCH payload may be transmitted through a first and a second PSBCH symbols. By determining a payload transmitted through a first and a second PSBCH symbols as described above, if the proportion of a transition period is high, since other PSBCH symbols in an S-SSB transmit all PSBCH payloads, degradation of decoding performance for the entire PSBCH payload can be prevented, even if a payload decoding for a first and a second PSBCH symbols fails. For example, a UE may allow the entire PSBCH payload to be transmitted, by allowing independent PSBCH payloads to be always transmitted for all PSBCH symbols except for a first and a second PSBCH symbols.

According to an embodiment of the present disclosure, when SL communication is performed in an FR2 frequency band in which relatively large SCS is used, the same payload as a PSBCH payload transmitted through symbols related to other PSBCHs in an S-SSB may be repeatedly transmitted through a first and a second PSBCH symbols, not an independent PSBCH payload. In addition, when SL communication is performed in the FR1 frequency band in which relatively small SCS is used, independent PSBCH payloads may be transmitted through a first and a second PSBCH symbols. For example, a UE may allow the entire PSBCH payload to be transmitted by allowing independent PSBCH payloads to be always transmitted for all PSBCH symbols except for a first and a second PSBCH symbols. Advantages and reasons for determining whether to transmit an independent payload as described above may be the same as a description above of an operation of determining whether to transmit an independent payload based on SCS.

According to an embodiment of the present disclosure, whether to transmit independent payloads through a first and a second PSBCH symbols may be determined based on the length of a CP used for SL communication. For example, when a CP used for SL communication is a normal CP, the proportion of a transition period in a first and a second PSBCH symbols may be relatively higher than when an extended CP is used. Accordingly, when a CP used for SL communication is a Normal CP, a transition period may have a greater influence on the decoding performance of a PSBCH symbol. For example, if a Normal CP is used for SL communication, instead of an independent PSBCH payload through a first and a second PSBCH symbols, a PSBCH payload transmitted through a symbol related to another PSBCH in an S-SSB is repeatedly transmitted, when an Extended CP is used, an independent PSBCH payload may be transmitted through a first and a second PSBCH symbols. For example, by allowing a UE to always transmit independent PSBCH payloads for all PSBCH symbols except for a first and a second PSBCH symbols, the entire PSBCH payload may be transmitted.

According to an embodiment of the present disclosure, in the case in which independent PSBCH payloads are not transmitted through a first and a second PSBCH symbols in the above operation, arbitrary dummy data may be transmitted through a first and a second PSBCH symbols. For example, even in this case, by allowing a UE to always transmit independent PSBCH payloads for all PSBCH symbols except for a first and a second PSBCH symbols, the entire PSBCH payload may be transmitted.

According to an embodiment of the present disclosure, with respect to the length of the frequency domain (FR1, FR2), SCS, and a CP, configuration of a PSBCH payload transmitted through a first and a second PSBCH symbols may be determined by each of the three conditions or a combination of the three conditions.

Figure 14:
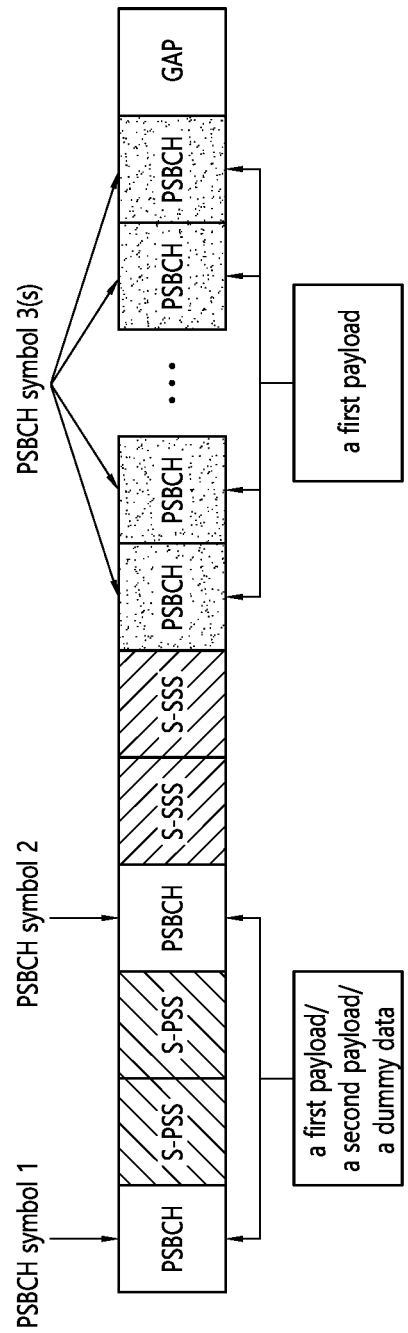
FIG. 14 shows a relationship between a symbol related to an S-SSB and a payload mapped to the symbol according to an embodiment of the present disclosure.

FIG. 14 shows a relationship between a symbol related to an S-SSB and a payload mapped to the symbol according to an embodiment of the present disclosure. The embodiment of FIG. 14 may be combined with various embodiments of the present disclosure.

Referring to FIG. 14, an S-SSB may include at least one symbol related to PSBCH, at least one symbol related to S-PSS, and at least one symbol related to S-SSS. For example, a PSBCH may be mapped to a first symbol (hereinafter, referred to as a PSBCH symbol 1). The S-SSB may include one symbol related to PSBCH (hereinafter, a PSBCH symbol 2) between the at least one symbol related to S-PSS and the at least one symbol related to S-SSS. A PSBCH may be mapped to the PSBCH symbol 2. In addition, the S-SSB may include at least one symbol related to PSBCH (hereinafter, referred to as a PSBCH symbol 3) after the at least one S-SSS symbol. A PSBCH may be mapped to the PSBCH symbol 3. For example, each independent PSBCH payload (hereinafter, a first payload) may be transmitted through the PSBCH symbol 3.

For example, based on SL communication using SCS of 15 kHz, through the PSBCH symbol 1 and/or the PSBCH symbol 2, a UE may transmit a PSBCH payload (hereinafter referred to as a second payload) independent of the first payload. Alternatively, a UE may repeatedly transmit the same payload as the first payload through the PSBCH symbol 1 and/or the PSBCH symbol 2 based on SL communication using SCS of 30 kHz or higher. Alternatively, based on SL communication using SCS of 30 kHz or higher, through the PSBCH symbol 1 and/or the PSBCH symbol 2, a UE may transmit dummy data different from the first payload and/or the second payload.

For example, based on SL communication performed in FR1, through the PSBCH symbol 1 and/or the PSBCH symbol 2, a UE may transmit the second payload. Or, based on the SL communication performed in FR2, through the PSBCH symbol 1 and/or the PSBCH symbol 2, a UE may repeatedly transmit the same payload as the first payload. Or, based on the SL communication performed in FR2, through the PSBCH symbol 1 and/or the PSBCH symbol 2, a UE may transmit dummy data different from the first payload and/or the second payload.

For example, based on SL communication using an Extended CP, through the PSBCH symbol 1 and/or the PSBCH symbol 2, a UE may transmit the second payload. Or, based on SL communication using a Normal CP, through the PSBCH symbol 1 and/or the PSBCH symbol 2, a UE may repeatedly transmit the same payload as the first payload. Or, based on SL communication using Normal CP, through the PSBCH symbol 1 and/or the PSBCH symbol 2, a UE may transmit dummy data different from the first payload and/or the second payload.

Whether to insert a DMRS in the PSBCH symbol 1 and the PSBCH symbol 2, and configuration of PSBCH payload transmitted through the PSBCH symbol 1 and the PSBCH symbol 2 may be made in association with each other, or may be determined independently of each other. For example, an embodiment in which whether to insert a DMRS in the PSBCH symbol 1 and the PSBCH symbol 2, and configuration of PSBCH payload transmitted through the PSBCH symbol 1 and the PSBCH symbol 2 may be made in association with each other may include an embodiment that when a DMRS is inserted into the PSBCH symbol 1 and the PSBCH symbol 2, an independent payload is transmitted through the PSBCH symbol 1 and the PSBCH symbol 2, and when a DMRS is not inserted into the PSBCH symbol 1 and the PSBCH symbol 2, the payload transmitted through other PSBCH symbols is repeatedly transmitted through the PSBCH symbol 1 and the PSBCH symbol 2.

The proposed operation may be applied when a QoS-related requirement for specific service data including the three conditions requires a level higher than a pre-defined or (pre-)configured threshold related to the requirements, among a plurality of service data transmitted through a carrier or sidelink bandwidth part (SL BWP) used for SL communication.

In the present disclosure, a method for minimizing degradation of PSBCH decoding performance regardless of PSBCH transmission parameters by determining whether to insert a DMRS for PSBCH symbols and whether to transmit independent PSBCH payloads according to PSBCH transmission parameters, when a transition period is inserted between a symbol related to S-PSS and a symbol related to S-SSS, considering the PSBCH decoding performance degradation due to a transition period, has been proposed.

Figure 15:
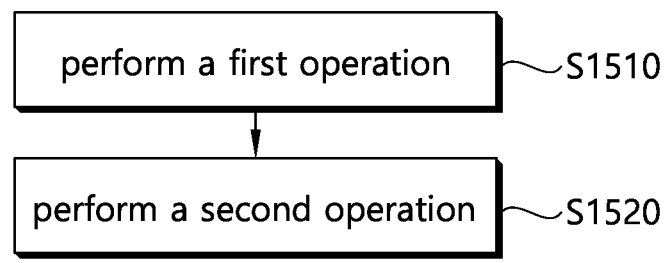
FIG. 15 is a flowchart of an operation performed by a first apparatus according to an embodiment of the present disclosure.

FIG. 15 is a flowchart of an operation performed by a first apparatus according to an embodiment of the present disclosure. The embodiment of FIG. 15 may be combined with various embodiments of the present disclosure.

Referring to FIG. 15, a flowchart illustrating operations performed by a first apparatus or a second apparatus related to the above-described embodiments of the present disclosure is provided. However, the above flowchart may not necessarily mean that all of the above steps are performed, or that only the above steps are performed except for other operations. For example, more necessary steps may be performed in addition to the above steps according to the contents described in the above-described embodiments of the present disclosure, or unnecessary steps among the above steps may be omitted. For example, the operations of the flowchart may constitute one of the above-mentioned proposals.

For example, a first operation may be an operation related to a DMRS insertion for a symbol related to a PSBCH and/or determination of a payload transmitted through a symbol related to the PSBCH based on at least one of a frequency domain (FR1, FR2), SCS, or CP length in the above description, and for details, refer to the description of a related part in the above description.

For example, a second operation may be an operation related to transmitting an SSB including a symbol related to a PSBCH in the above description, and for details, refer to the description of a related part in the above description.

Figure 16:
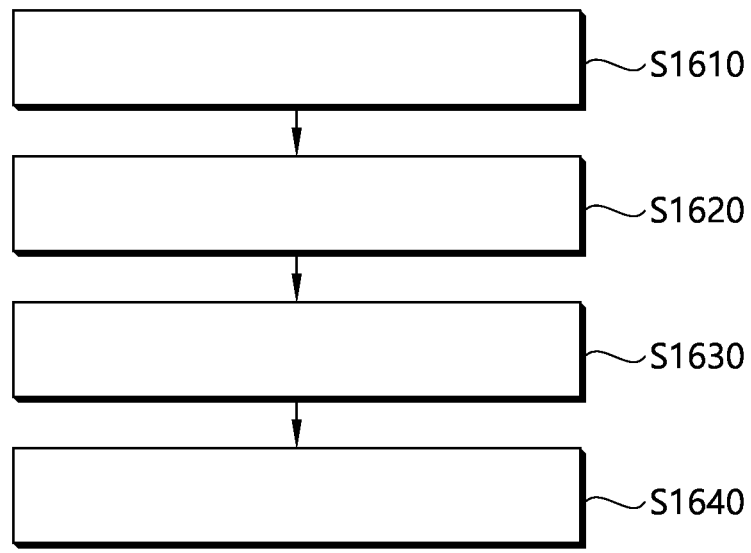
FIG. 16 shows a procedure in which a first apparatus transmits an S-SSB according to an embodiment of the present disclosure.

FIG. 16 shows a procedure in which a first apparatus transmits an S-SSB according to an embodiment of the present disclosure. The embodiment of FIG. 16 may be combined with various embodiments of the present disclosure.

Referring to FIG. 16, in step S1610, a first apparatus may determine whether to map a demodulation reference signal (DM-RS) to a symbol 1 or a symbol 2 among symbols related to physical sidelink broadcast channel (PSBCH). In step S1620, the first apparatus may determine whether to map a first payload or a second payload to the symbol 1 or the symbol 2. In step S1630, the first apparatus may generate a sidelink synchronization signal block (S-SSB). For example, symbols related to the S-SSB may include a symbol related to a sidelink primary synchronization signal (S-PSS), a symbol related to a sidelink secondary synchronization signal (S-SSS), and the symbols related to the PSBCH, the S-PSS may be mapped to symbols after the first symbol among the symbols related to the S-SSB, the S-SSS may be mapped to symbols after the symbol related to the S-PSS among the symbols related to the S-SSB, and the PSBCH may be mapped to a symbol after the symbol related to the S-SSS among the symbols related to the S-SSB, the symbol 1, and the symbol 2. In step S1640, the first apparatus may transmit the S-SSB to a second apparatus. For example, the first payload may be different from the second payload, the symbol 1 may be the first symbol among the symbols related to the PSBCH, and the symbol 2 may be a symbol between the symbol related to the S-PSS and the symbol related to the S-SSS, among the symbols related to the PSBCH.

For example, the DM-RS may be mapped to a symbol after the symbol related to the S-SSS among the symbols related to the PSBCH.

For example, the DM-RS may be mapped to the symbol 1 or the symbol 2 among the symbols related to the PSBCH, based on that the S-SSB is transmitted with subcarrier spacing (SCS) with a frequency of 15 kHz.

For example, the DM-RS may be mapped to the symbol 1 or the symbol 2 among the symbols related to the PSBCH, based on that the S-SSB is transmitted in frequency range 1 (FR1).

For example, the DM-RS may be mapped to the symbol 1 or the symbol 2 among the symbols related to the PSBCH, based on that a cyclic prefix (CP) used in the SL communication is an extended CP.

For example, the second payload may be mapped to a symbol after the symbol related to the S-SSS among the symbols related to the PSBCH.

For example, the first payload may be mapped to the symbol 1 or the symbol 2 among the symbols related to the PSBCH, based on that the S-SSB is transmitted with SCS with a frequency of 15 kHz.

For example, the first payload may be mapped to the symbol 1 or the symbol 2 among the symbols related to the PSBCH, based on that the S-SSB is transmitted in FR 1.

For example, the second payload may be mapped to the symbol 1 or the symbol 2 among the symbols related to the PSBCH, based on that the S-SSB is transmitted in FR 2.

For example, the first payload may be mapped to the symbol 1 or the symbol 2 among the symbols related to the PSBCH, based on that a CP used in the transmission of the S-SSB is an extended CP.

For example, the second payload may be mapped to the symbol 1 or the symbol 2 among the symbols related to the PSBCH, based on that a CP used in the transmission of the S-SSB is a normal CP.

For example, the first payload may be mapped to the symbol 1 or the symbol 2 among the symbols related to the PSBCH, based on that the DM-RS is mapped to the symbol 1 or the symbol 2 among the symbols related to the PSBCH.

For example, any dummy data may be mapped to the symbol 1 or the symbol 2 among the symbols related to the PSBCH, based on that the S-SSB in transmitted with SCS of frequency greater than or equal to 30 kHz.

The above-described embodiment may be applied to various apparatuses to be described below. For example, a processor 102 of a first apparatus 100 may determine whether to map a demodulation reference signal (DM-RS) to a symbol 1 or a symbol 2 among symbols related to physical sidelink broadcast channel (PSBCH). And, the processor 102 of the first apparatus 100 may determine whether to map a first payload or a second payload to the symbol 1 or the symbol 2. And, the processor 102 of the first apparatus 100 may generate a sidelink synchronization signal block (S-SSB). For example, symbols related to the S-SSB may include a symbol related to a sidelink primary synchronization signal (S-PSS), a symbol related to a sidelink secondary synchronization signal (S-SSS), and the symbols related to the PSBCH, the S-PSS may be mapped to symbols after the first symbol among the symbols related to the S-SSB, the S-SSS may be mapped to symbols after the symbol related to the S-PSS among the symbols related to the S-SSB, and the PSBCH may be mapped to a symbol after the symbol related to the S-SSS among the symbols related to the S-SSB, the symbol 1, and the symbol 2. And, the processor 102 of the first apparatus 100 may control a transceiver 106 to transmit the S-SSB to a second apparatus 200. For example, the first payload may be different from the second payload, wherein the symbol 1 is a first symbol among the symbols related to the PSBCH, and the symbol 2 may be a symbol between the symbol related to the S-PSS and the symbol related to the S-SSS, among the symbols related to the PSBCH.

According to an embodiment of the present disclosure, a first apparatus for performing wireless communication may be proposed. For example, the first apparatus may comprise: one or more memories storing instructions; one or more transceivers; and one or more processors connected to the one or more memories and the one or more transceivers. For example, the one or more processors may execute the instructions to: determine whether to map a demodulation reference signal (DM-RS) to a symbol 1 or a symbol 2 among symbols related to physical sidelink broadcast channel (PSBCH); determine whether to map a first payload or a second payload to the symbol 1 or the symbol 2; generate a sidelink synchronization signal block (S-SSB), wherein symbols related to the S-SSB include a symbol related to a sidelink primary synchronization signal (S-PSS), a symbol related to a sidelink secondary synchronization signal (S-SSS), and the symbols related to the PSBCH, wherein the S-PSS is mapped to symbols after the first symbol among the symbols related to the S-SSB, wherein the S-SSS is mapped to symbols after the symbol related to the S-PSS among the symbols related to the S-SSB, and wherein the PSBCH is mapped to a symbol after the symbol related to the S-SSS among the symbols related to the S-SSB, the symbol 1, and the symbol 2; and transmit the S-SSB to a second apparatus, wherein the first payload is different from the second payload, wherein the symbol 1 is a first symbol among the symbols related to the PSBCH, and wherein the symbol 2 is a symbol between the symbol related to the S-PSS and the symbol related to the S-SSS, among the symbols related to the PSBCH.

According to an embodiment of the present disclosure, an apparatus configured to control a first user equipment (UE) may be proposed. For example, the apparatus may comprise: one or more processors; and one or more memories operably connectable to the one or more processors and storing instructions, wherein the one or more processors execute the instructions to: determine whether to map a demodulation reference signal (DM-RS) to a symbol 1 or a symbol 2 among symbols related to physical sidelink broadcast channel (PSBCH); determine whether to map a first payload or a second payload to the symbol 1 or the symbol 2; generate a sidelink synchronization signal block (S-SSB), wherein symbols related to the S-SSB include a symbol related to a sidelink primary synchronization signal (S-PSS), a symbol related to a sidelink secondary synchronization signal (S-SSS), and the symbols related to the PSBCH, wherein the S-PSS is mapped to symbols after the first symbol among the symbols related to the S-SSB, wherein the S-SSS is mapped to symbols after the symbol related to the S-PSS among the symbols related to the S-SSB, and wherein the PSBCH is mapped to a symbol after the symbol related to the S-SSS among the symbols related to the S-SSB, the symbol 1, and the symbol 2; and transmit the S-SSB to a second UE, wherein the first payload is different from the second payload, wherein the symbol 1 is a first symbol among the symbols related to the PSBCH, and wherein the symbol 2 is a symbol between the symbol related to the S-PSS and the symbol related to the S-SSS, among the symbols related to the PSBCH.

According to an embodiment of the present disclosure, a non-transitory computer-readable storage medium storing instructions may be proposed. For example, the instructions, when executed, may cause a first apparatus to: determine whether to map a demodulation reference signal (DM-RS) to a symbol 1 or a symbol 2 among symbols related to physical sidelink broadcast channel (PSBCH); determine whether to map a first payload or a second payload to the symbol 1 or the symbol 2; generate a sidelink synchronization signal block (S-SSB), wherein symbols related to the S-SSB include a symbol related to a sidelink primary synchronization signal (S-PSS), a symbol related to a sidelink secondary synchronization signal (S-SSS), and the symbols related to the PSBCH, wherein the S-PSS is mapped to symbols after the first symbol among the symbols related to the S-SSB, wherein the S-SSS is mapped to symbols after the symbol related to the S-PSS among the symbols related to the S-SSB, and wherein the PSBCH is mapped to a symbol after the symbol related to the S-SSS among the symbols related to the S-SSB, the symbol 1, and the symbol 2; and transmit the S-SSB to a second apparatus, wherein the first payload is different from the second payload, wherein the symbol 1 is a first symbol among the symbols related to the PSBCH, and wherein the symbol 2 is a symbol between the symbol related to the S-PSS and the symbol related to the S-SSS, among the symbols related to the PSBCH.

Figure 17:
FIG. 17 shows a procedure in which a second apparatus receives an S-SSB, according to an embodiment of the present disclosure.

FIG. 17 shows a procedure in which a second apparatus receives an S-SSB, according to an embodiment of the present disclosure. The embodiment of FIG. 17 may be combined with various embodiments of the present disclosure.

Referring to FIG. 17, in step S1710, a second apparatus may receive a sidelink synchronization signal block (S-SSB) from a first apparatus. For example, symbols related to the S-SSB may include a symbol related to a sidelink primary synchronization signal (S-PSS), a symbol related to a sidelink secondary synchronization signal (S-SSS), and the symbols related to a physical sidelink broadcast channel (PSBCH), the S-PSS may be mapped to symbols after the first symbol among the symbols related to the S-SSB, the S-SSS may be mapped to symbols after the symbol related to the S-PSS among the symbols related to the S-SSB, the PSBCH may be mapped to a symbol after the symbol related to the S-SSS among the symbols related to the S-SSB, a symbol 1, and a symbol 2, a demodulation reference signal (DM-RS) may be mapped to a symbol after the symbol related to the S-SSS among the symbols related to the PSBCH, a second payload may be mapped to a symbol after the symbol related to the S-SSS among the symbols related to the PSBCH, the DM-RS may be mapped to the symbol 1 or the symbol 2 among the symbols related to the PSBCH, based on that the S-SSB is transmitted with subcarrier spacing (SCS) with a frequency of 15 kHz, the symbol 1 may be the first symbol among the symbols related to the PSBCH, and the symbol 2 may be a symbol between the symbol related to the S-PSS and the symbol related to the S-SSS, among the symbols related to the PSBCH.

For example, a first payload may be mapped to the symbol 1 or the symbol 2 among the symbols related to the PSBCH, based on that the S-SSB is transmitted with SCS with a frequency of 15 kHz, and the first payload may be different from the second payload.

The above-described embodiment may be applied to various devices to be described below. For example, a processor 202 of a second apparatus 200 may control a transceiver 206 to receive a sidelink synchronization signal block (S-SSB) from a first apparatus. For example, symbols related to the S-SSB may include a symbol related to a sidelink primary synchronization signal (S-PSS), a symbol related to a sidelink secondary synchronization signal (S-SSS), and the symbols related to a physical sidelink broadcast channel (PSBCH), the S-PSS may be mapped to symbols after the first symbol among the symbols related to the S-SSB, the S-SSS may be mapped to symbols after the symbol related to the S-PSS among the symbols related to the S-SSB, the PSBCH may be mapped to a symbol after the symbol related to the S-SSS among the symbols related to the S-SSB, a symbol 1, and a symbol 2, a demodulation reference signal (DM-RS) may be mapped to a symbol after the symbol related to the S-SSS among the symbols related to the PSBCH, a second payload may be mapped to a symbol after the symbol related to the S-SSS among the symbols related to the PSBCH, the DM-RS may be mapped to the symbol 1 or the symbol 2 among the symbols related to the PSBCH, based on that the S-SSB is transmitted with subcarrier spacing (SCS) with a frequency of 15 kHz, the symbol 1 may be the first symbol among the symbols related to the PSBCH, and the symbol 2 may be a symbol between the symbol related to the S-PSS and the symbol related to the S-SSS, among the symbols related to the PSBCH.

According to an embodiment of the present disclosure, a second apparatus for performing wireless communication may be proposed. For example, the second apparatus may comprise: one or more memories storing instructions; one or more transceivers; and one or more processors connected to the one or more memories and the one or more transceivers, wherein the one or more processors execute the instructions to: receive a sidelink synchronization signal block (S-SSB) from a first apparatus, wherein symbols related to the S-SSB include a symbol related to a sidelink primary synchronization signal (S-PSS), a symbol related to a sidelink secondary synchronization signal (S-SSS), and the symbols related to a physical sidelink broadcast channel (PSBCH), wherein the S-PSS is mapped to symbols after the first symbol among the symbols related to the S-SSB, wherein the S-SSS is mapped to symbols after the symbol related to the S-PSS among the symbols related to the S-SSB, wherein the PSBCH is mapped to a symbol after the symbol related to the S-SSS among the symbols related to the S-SSB, a symbol 1, and a symbol 2, wherein a demodulation reference signal (DM-RS) is mapped to a symbol after the symbol related to the S-SSS among the symbols related to the PSBCH, wherein a second payload is mapped to a symbol after the symbol related to the S-SSS among the symbols related to the PSBCH, wherein the DM-RS is mapped to the symbol 1 or the symbol 2 among the symbols related to the PSBCH, based on that the S-SSB is transmitted with subcarrier spacing (SCS) with a frequency of 15 kHz, wherein the symbol 1 is a first symbol among the symbols related to the PSBCH, and wherein the symbol 2 is a symbol between the symbol related to the S-PSS and the symbol related to the S-SSS, among the symbols related to the PSBCH.

For example, a first payload may be mapped to the symbol 1 or the symbol 2 among the symbols related to the PSBCH, based on that the S-SSB is transmitted with SCS with a frequency of 15 kHz, and the first payload may be different from the second payload.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 18:
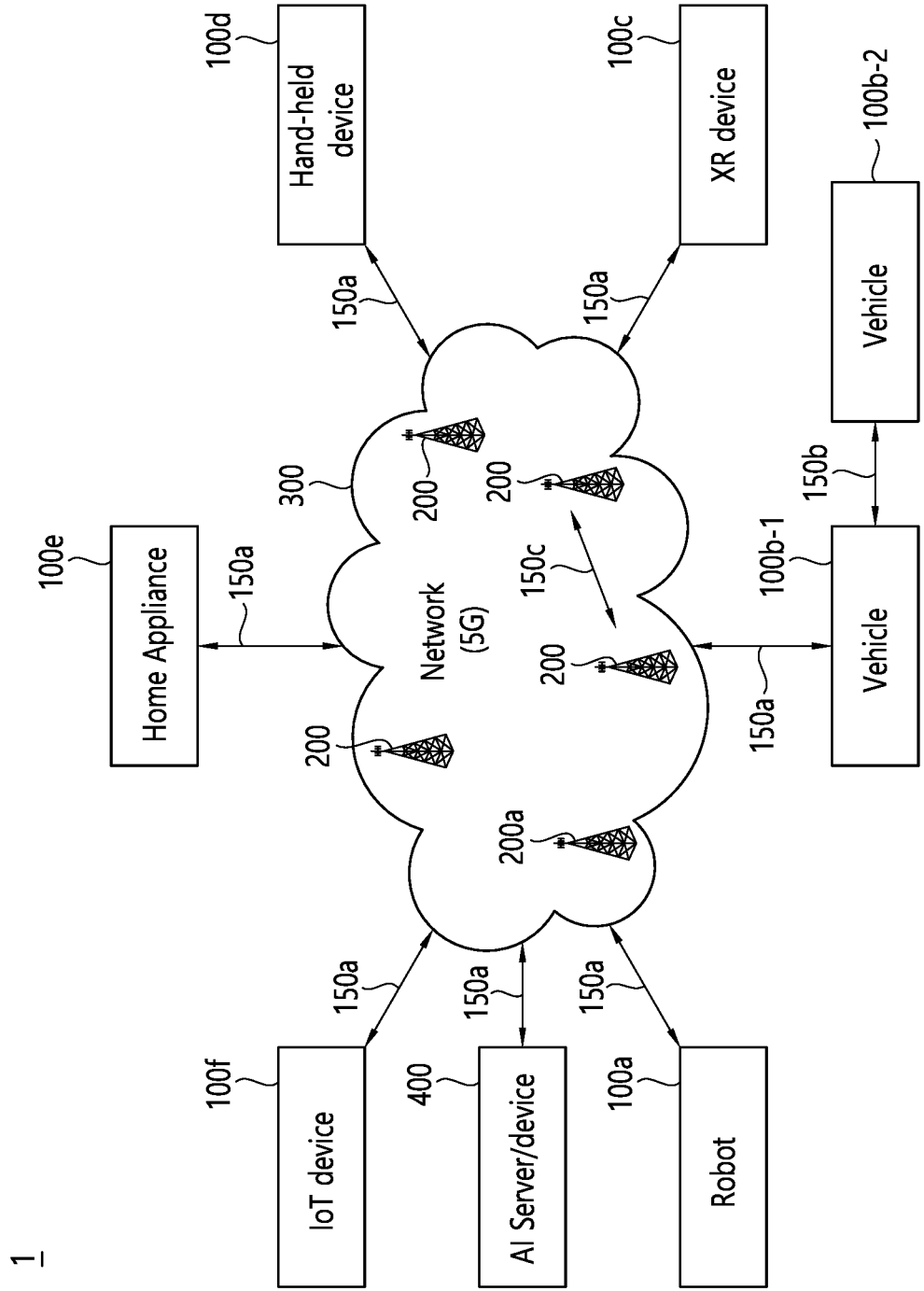
FIG. 18 shows a communication system 1, in accordance with an embodiment of the present disclosure.

FIG. 18 shows a communication system 1, in accordance with an embodiment of the present disclosure.

Referring to FIG. 18, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Here, wireless communication technology implemented in wireless devices 100*a* to 100*f* of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100*a* to 100*f* of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100*a* to 100*f* of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
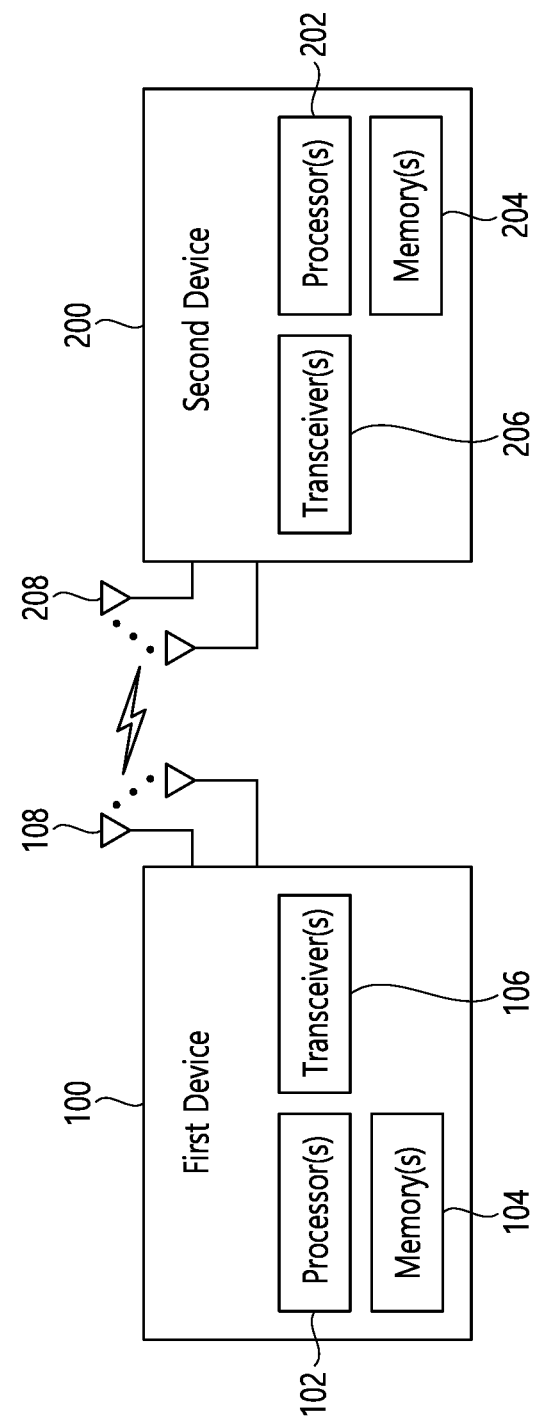
FIG. 19 shows wireless devices, in accordance with an embodiment of the present disclosure.

FIG. 19 shows wireless devices, in accordance with an embodiment of the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
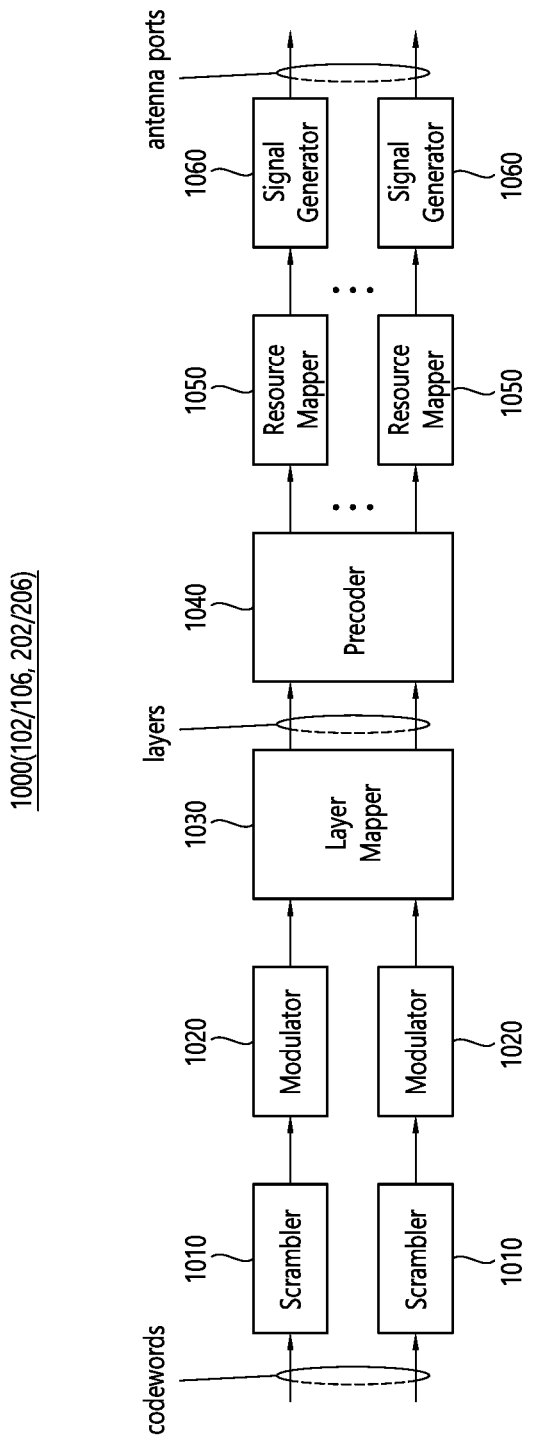
FIG. 20 shows a signal process circuit for a transmission signal, in accordance with an embodiment of the present disclosure.

FIG. 20 shows a signal process circuit for a transmission signal, in accordance with an embodiment of the present disclosure.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers.

To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 21:
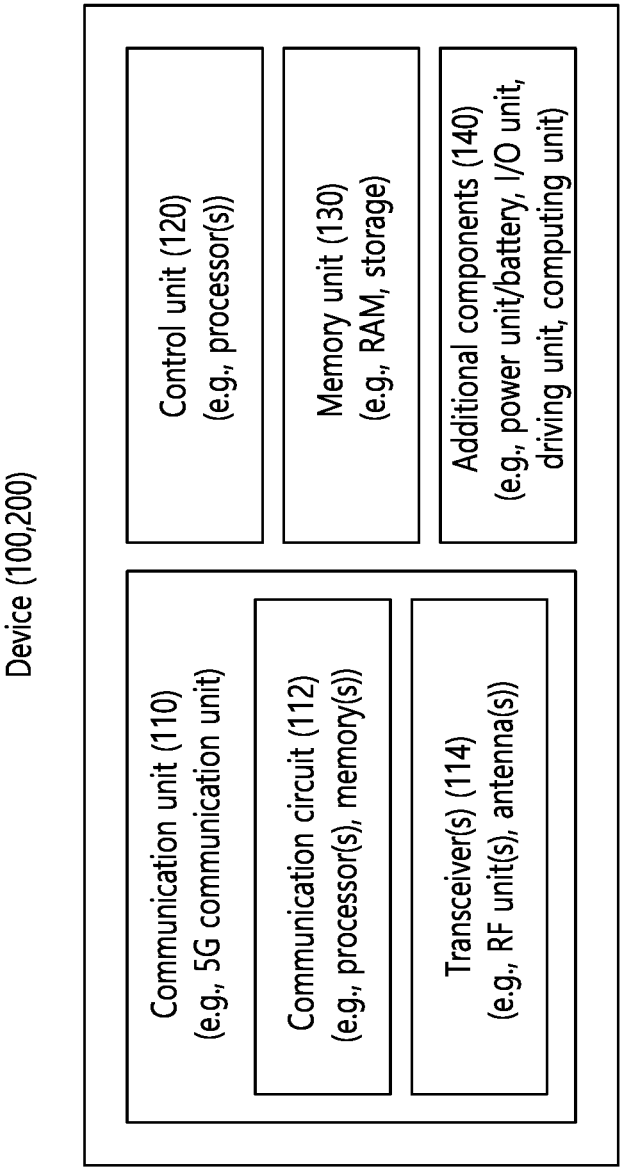
FIG. 21 shows a wireless device, in accordance with an embodiment of the present disclosure.

FIG. 21 shows another example of a wireless device, in accordance with an embodiment of the present disclosure. The wireless device may be implemented in various forms according to a use-case/service (refer to FIG. 18).

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Figure 22:
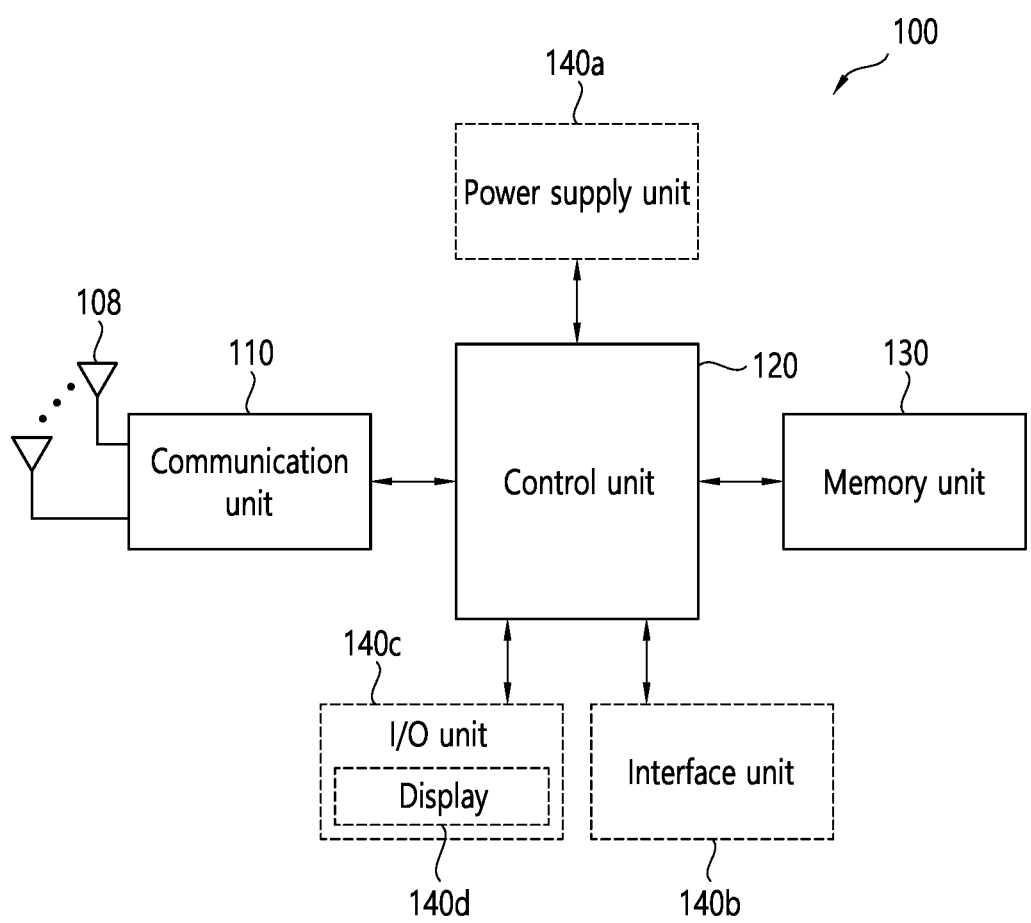
FIG. 22 shows a hand-held device, in accordance with an embodiment of the present disclosure.

FIG. 22 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 23:
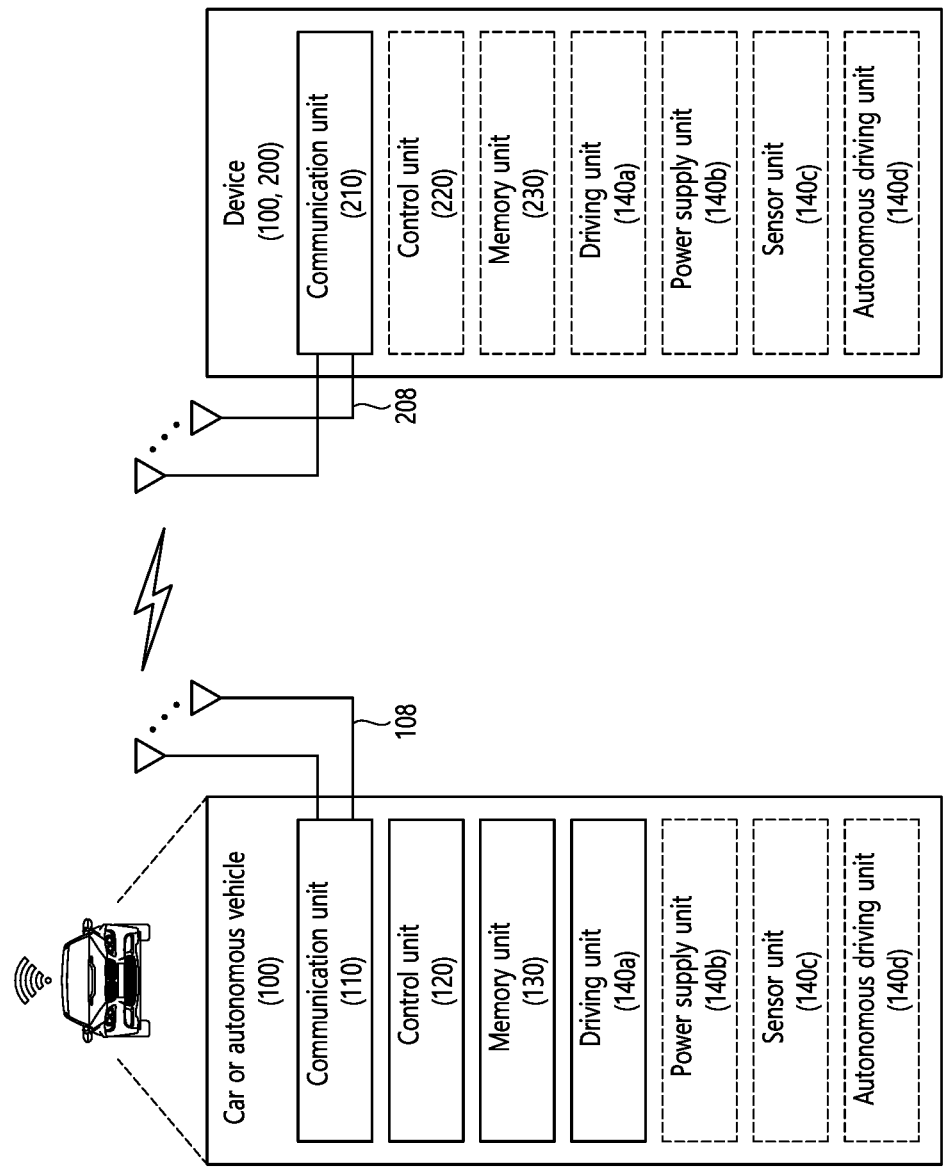
FIG. 23 shows a car or an autonomous vehicle, in accordance with an embodiment of the present disclosure.

FIG. 23 shows a vehicle or an autonomous vehicle, in accordance with an embodiment of the present disclosure.

The vehicle or autonomous vehicle may be implemented by a mobile robot, a car, a train, a manned/unmanned Aerial Vehicle (AV), a ship, etc.

Referring to FIG. 23, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first apparatus, wireless communication, the method comprising:
   generating a sidelink synchronization signal block (S-SSB),
   wherein symbols related to the S-SSB include a symbol related to a sidelink primary synchronization signal (S-PSS), a symbol related to a sidelink secondary synchronization signal (S-SSS), and symbols related to a physical sidelink broadcast channel (PSBCH),
   wherein the S-PSS is mapped to symbols after the first symbol among the symbols related to the S-SSB,
   wherein the S-SSS is mapped to symbols after the symbol related to the S-PSS among the symbols related to the S-SSB,
   wherein the PSBCH is mapped to i) a symbol after the symbol related to the S-SSS among the symbols related to the S-SSB, ii) a symbol 1, and iii) a symbol 2,
   wherein a demodulation reference signal (DM-RS) is mapped to the symbol 1 or the symbol 2 among the symbols related to the PSBCH,
   wherein the symbol 1 is a first symbol among the symbols related to the PSBCH,
   wherein the symbol 2 is a symbol between the symbol related to the S-PSS and the symbol related to the S-SSS, among the symbols related to the PSBCH,
   wherein a second payload is mapped to a symbol after the symbol related to the S-SSS among the symbols related to the PSBCH, and
   wherein what is mapped to the symbol 1 or the symbol 2 among the symbols related to the PSBCH is one among:
   a first payload, which is different from the second payload, based on one of: i) that the S-SSB is transmitted with SCS with a frequency of 15 kHz, ii) that the S-SSB is transmitted in FR 1, iii) that a CP used in the transmission of the S-SSB is an extended CP, or iv) that the DM-RS is mapped to the symbol 1 or the symbol 2 among the symbols related to the PSBCH;
   the second payload, based on: i) that the S-SSB is transmitted in FR 2, or ii) that a CP used in the transmission of the S-SSB is a normal CP; or
   any dummy data, based on that the S-SSB in transmitted with SCS of frequency greater than or equal to 30 kHz; and
   transmitting the S-SSB to a second apparatus.

2. The method of claim 1, wherein the DM-RS is mapped to the symbol 1 or the symbol 2 among the symbols related to the PSBCH, based on that the S-SSB is transmitted with subcarrier spacing (SCS) with a frequency of 15 kHz.

3. The method of claim 1, wherein the DM-RS is mapped to the symbol 1 or the symbol 2 among the symbols related to the PSBCH, based on that the S-SSB is transmitted in frequency range 1 (FR1).

4. The method of claim 1, wherein the DM-RS is mapped to the symbol 1 or the symbol 2 among the symbols related to the PSBCH, based on that a cyclic prefix (CP) used in the SL communication is an extended CP.

5. A first apparatus for performing wireless communication, the first apparatus comprising:

one or more memories storing instructions;
one or more transceivers; and
one or more processors connected to the one or more memories and the one or more transceivers, wherein the one or more processors execute the instructions to:
generate a sidelink synchronization signal block (S-SSB),
wherein symbols related to the S-SSB include a symbol related to a sidelink primary synchronization signal (S-PSS), a symbol related to a sidelink secondary synchronization signal (S-SSS), and symbols related to a physical sidelink broadcast channel (PSBCH),
wherein the S-PSS is mapped to symbols after the first symbol among the symbols related to the S-SSB,
wherein the S-SSS is mapped to symbols after the symbol related to the S-PSS among the symbols related to the S-SSB,
wherein the PSBCH is mapped to i) a symbol after the symbol related to the S-SSS among the symbols related to the S-SSB, ii) a symbol 1, and iii) a symbol 2,
wherein a demodulation reference signal (DM-RS) is mapped to the symbol 1 or the symbol 2 among the symbols related to the PSBCH,
wherein the symbol 1 is the first symbol among the symbols related to the PSBCH,
wherein the symbol 2 is a symbol between the symbol related to the S-PSS and the symbol related to the S-SSS, among the symbols related to the PSBCH,
wherein a second payload is mapped to a symbol after the symbol related to the S-SSS among the symbols related to the PSBCH, and
wherein what is mapped to the symbol 1 or the symbol 2 among the symbols related to the PSBCH is one among:
a first payload, which is different from the second payload, based on one of: i) that the S-SSB is transmitted with SCS with a frequency of 15 kHz, ii) that the S-SSB is transmitted in FR 1, iii) that a CP used in the transmission of the S-SSB is an extended CP, or iv) that the DM-RS is mapped to the symbol 1 or the symbol 2 among the symbols related to the PSBCH;
the second payload, based on: i) that the S-SSB is transmitted in FR 2, or ii) that a CP used in the transmission of the S-SSB is a normal CP; or
any dummy data, based on that the S-SSB in transmitted with SCS of frequency greater than or equal to 30 kHz; and
transmit the S-SSB to a second apparatus.

6. An apparatus configured to control a first user equipment (UE), the apparatus comprising:
one or more processors; and
one or more memories operably connectable to the one or more processors and storing instructions, wherein the one or more processors execute the instructions to:
generate a sidelink synchronization signal block (S-SSB),
wherein symbols related to the S-SSB include a symbol related to a sidelink primary synchronization signal (S-PSS), a symbol related to a sidelink secondary synchronization signal (S-SSS), and symbols related to a physical sidelink broadcast channel (PSBCH),
wherein the S-PSS is mapped to symbols after the first symbol among the symbols related to the S-SSB,
wherein the S-SSS is mapped to symbols after the symbol related to the S-PSS among the symbols related to the S-SSB,
wherein the PSBCH is mapped to i) a symbol after the symbol related to the S-SSS among the symbols related to the S-SSB, ii) a symbol 1, and iii) a symbol 2,
wherein a demodulation reference signal (DM-RS) is mapped to the symbol 1 or the symbol 2 among the symbols related to the PSBCH,
wherein the symbol 1 is a first symbol among the symbols related to the PSBCH,
wherein the symbol 2 is a symbol between the symbol related to the S-PSS and the symbol related to the S-SSS, among the symbols related to the PSBCH,
wherein a second payload is mapped to a symbol after the symbol related to the S-SSS among the symbols related to the PSBCH, and
wherein what is mapped to the symbol 1 or the symbol 2 among the symbols related to the PSBCH is one among:
a first payload, which is different from the second payload, based on one of: i) that the S-SSB is transmitted with SCS with a frequency of 15 kHz, ii) that the S-SSB is transmitted in FR 1, iii) that a CP used in the transmission of the S-SSB is an extended CP, or iv) that the DM-RS is mapped to the symbol 1 or the symbol 2 among the symbols related to the PSBCH;
the second payload, based on: i) that the S-SSB is transmitted in FR 2, or ii) that a CP used in the transmission of the S-SSB is a normal CP; or
any dummy data, based on that the S-SSB in transmitted with SCS of frequency greater than or equal to 30 kHz; and
transmit the S-SSB to a second UE.

* * * * *